(12) United States Patent
Kim et al.

(10) Patent No.: US 10,225,437 B2
(45) Date of Patent: Mar. 5, 2019

(54) IMAGE SCANNING APPARATUS AND METHOD OF CONTROLLING SCAN

(71) Applicant: S-Printing Solution Co., Ltd., Suwon-si (KR)

(72) Inventors: Jung-han Kim, Suwon-si (KR); Dong-yeol Jung, Yongin-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 0 days.

(21) Appl. No.: 15/668,145

(22) Filed: Aug. 3, 2017

(65) Prior Publication Data

US 2018/0109697 A1  Apr. 19, 2018

(30) Foreign Application Priority Data

Oct. 14, 2016  (KR) .................. 10-2016-0133511

(51) Int. Cl.
*H04N 1/00* (2006.01)
*H04N 1/40* (2006.01)

(52) U.S. Cl.
CPC ..... *H04N 1/40056* (2013.01); *H04N 1/00209* (2013.01); *H04N 1/00408* (2013.01); *H04N 1/00795* (2013.01); *H04N 2201/0081* (2013.01)

(58) Field of Classification Search
CPC ........... H04N 1/00209; H04N 1/00408; H04N 1/00795; H04N 1/40056; H04N 2201/0081
USPC .......................................... 358/482, 483, 474
See application file for complete search history.

(56) References Cited

U.S. PATENT DOCUMENTS

| | | | | |
|---|---|---|---|---|
| 4,791,678 A | * | 12/1988 | Iwase | G06T 5/20 358/447 |
| 5,270,687 A | * | 12/1993 | Killebrew, Jr. | G09G 5/06 345/602 |
| 5,864,656 A | | 1/1999 | Park | |
| 6,961,136 B2 | * | 11/2005 | Ogura | H04N 1/00888 358/1.14 |
| 8,334,913 B2 | | 12/2012 | Sakurai et al. | |
| 8,346,107 B2 | * | 1/2013 | Song | G03G 15/5004 399/37 |
| 8,766,160 B2 | | 7/2014 | Kato | |
| 9,055,243 B2 | * | 6/2015 | Kita | H04N 5/23245 |
| 9,110,645 B2 | * | 8/2015 | Song | G06F 1/26 |
| 9,185,242 B2 | * | 11/2015 | Shibao | H04N 1/00217 |
| 9,350,902 B2 | * | 5/2016 | Tai | H04N 1/6008 |
| 9,692,922 B2 | * | 6/2017 | Shimizu | H04N 1/00795 |
| 2008/0291756 A1 | * | 11/2008 | Joo | G11C 7/1006 365/191 |

(Continued)

FOREIGN PATENT DOCUMENTS

| | | |
|---|---|---|
| JP | 2011-147056 A | 7/2011 |
| JP | 2014-041972 A | 3/2014 |

*Primary Examiner* — Negussie Worku
(74) *Attorney, Agent, or Firm* — Staas & Halsey LLP

(57) ABSTRACT

An image scanning apparatus is provided. The image scanning apparatus includes an image sensor configured to scan image information of a manuscript, a converter configured to convert a signal scanned by the image sensor into a digital signal, a processor configured to control the converter by using a plurality of control signals and perform image-processing with respect to the signal converted into the digital signal, and a reset circuit unit configured to generate a reset signal by using the plurality of control signals and provide the converter with the generated reset signal.

20 Claims, 13 Drawing Sheets

(56) References Cited

U.S. PATENT DOCUMENTS

| | | | | |
|---|---|---|---|---|
| 2010/0321728 A1* | 12/2010 | Shibao | | H04N 1/00204 |
| | | | | 358/1.15 |
| 2011/0188333 A1* | 8/2011 | Lee | | G11C 7/08 |
| | | | | 254/208 |
| 2012/0092732 A1* | 4/2012 | Nakazawa | | H04N 1/00928 |
| | | | | 358/474 |
| 2012/0133750 A1* | 5/2012 | Talbert | | A61B 1/00002 |
| | | | | 348/65 |
| 2013/0063653 A1* | 3/2013 | Kita | | H04N 5/23245 |
| | | | | 348/362 |
| 2013/0097434 A1* | 4/2013 | Song | | G06F 1/26 |
| | | | | 713/300 |
| 2013/0107094 A1 | 5/2013 | Yamamoto et al. | | |
| 2015/0264213 A1* | 9/2015 | Tai | | H04N 1/6008 |
| | | | | 358/509 |
| 2016/0277615 A1* | 9/2016 | Shimizu | | H04N 1/00795 |
| 2017/0208198 A1* | 7/2017 | Sunako | | H04N 1/00689 |
| 2017/0359476 A1* | 12/2017 | Takeuchi | | H04N 1/10 |

* cited by examiner

FIG. 12

| Addr. | AFE A | AFE B |
|---|---|---|
| 0x00 | 0x00 | 0x00 |
| 0x01 | 0x01 | 0x00 |
| 0x02 | 0x00 | 0x00 |
| 0x03 | 0x5A | 0x00 |
| 0x04 | 0x00 | 0x00 |
| Match Logic | 5 | 2 |

IMAGE SCANNING APPARATUS AND METHOD OF CONTROLLING SCAN

CROSS-REFERENCE TO RELATED APPLICATIONS

This application claims priority from Korean Patent Application No. 10-2016-0133511, filed on Oct. 14, 2016, in the Korean Intellectual Property Office, the disclosure of which is incorporated herein by reference in its entirety.

BACKGROUND OF THE INVENTION

Field of the Invention

Apparatuses and methods consistent with the present invention relate to an image scanning apparatus and a method of controlling a scan, and more particularly, to an image scanning apparatus capable of controlling an Analog Front End (AFE) requiring a reset signal and an AFE not requiring a reset signal by using an interface, and a method of controlling a scan.

Description of the Related Art

An image scanning apparatus is an apparatus that scans an original image such as a document, a picture, a film, or the like and then converts the scanned image into digital data. In this case, the digital data may be displayed on a monitor of a computer or may be printed by a printer so as to be generated as an output image. Examples of the image scanning apparatus may include a scanner, a copier, a fax machine, a Multi-Function Peripheral (MFP) that complexly realizes their functions through one apparatus, and the like.

The image scanning apparatus scans a manuscript by using a device such as a Contact Image Sensor (CIS), a Charge Coupled Device (CCD), or the like. A CIS that may be made small without dispersing an optical path has been widely used for an image scanning apparatus.

However, since it is difficult for a CIS to rapidly acquire an image due to a large charge distribution between pixels, there is a tendency to embed an Analog Front End (AFE) for processing an image scanned by the CIS at a high speed. Here, the AFE is an apparatus that converts a signal scanned by the CIS into a digital signal, and there are an AFE requiring a reset signal and an AFE not requiring a reset signal according to manufacturers.

Since using a reset signal depends on manufacturers, it is impossible to use an AFE requiring a reset signal without improving an interface type in an existing environment using an AFE not requiring a reset signal.

Therefore, there is a need for a method of maintaining an existing interface type and using an AFE requiring a reset signal.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an image scanning apparatus capable of controlling an Analog Front End (AFE) requiring a reset signal and an AFE not requiring a reset signal by using an interface, and a method of controlling a scan.

According to an aspect of the present invention, an image scanning apparatus includes an image sensor configured to scan image information of a manuscript, a converter configured to convert a signal scanned by the image sensor into a digital signal, a processor configured to control the converter by using a plurality of control signals and perform image-processing with respect to the signal converted into the digital signal, and a reset circuit unit configured to generate a reset signal by using the plurality of control signals and provide the converter with the generated reset signal.

The plurality of control signals may be an enable signal and a clock signal. The reset circuit unit may include an NAND logic circuit configured to perform NAND logic processing with respect to the enable signal and the clock signal.

The reset circuit unit may further include a resistor-capacitor (RC) filter configured to reduce output noise of the NAND logic circuit.

The processor may enable the enable signal and the clock signal to simultaneously have high values merely in a point of time when resetting the converter is required.

The plurality of control signals may be an enable signal and a control code signal. The reset circuit unit may include an NAND logic circuit configured to perform NAND logic processing with respect to the enable signal and the control code signal.

The processor may enable the enable signal and the control code signal to simultaneously have high values merely in a point of time when resetting the converter is required.

The processor may check a type of the converter, generate a plurality of control signals corresponding to the checked type, and provide the converter with the plurality of control signals.

The processor may check the type of the converter by receiving type identification (ID) information from the converter.

The processor may generate the plurality of control signals by using a driver program corresponding to the received type ID information among a plurality of driver programs that are pre-stored.

The image scanning apparatus may further include a resistor configured to be constituted as a pull-up resistor or a pull-down resistor according to the type of the converter. The processor may check the type of the converter according to a voltage value of the resistor.

The image sensor may be a Complementary Metal Oxide Semiconductor (CMOS) image sensor (CIS).

The image scanning apparatus may further include a lighting unit configured to provide the manuscript with light. The converter may control an operation of the lighting unit.

The image scanning apparatus may further include a storage unit configured to store the image-processed digital signal as a scan image.

The image scanning apparatus may further include an image former configured to print the image-processed digital signal.

According to another aspect of the present invention, a method of controlling a scan, includes checking a type of a converter configured to convert a signal scanned by an image sensor into a digital signal, generating a plurality of control signals according to a method corresponding to the checked type, and controlling the converter by using the plurality of control signals.

The generating of the plurality of control signals may include, if the converter is an apparatus requiring an input of a reset signal, generating an enable signal and a clock signal simultaneously having high values merely in a point of time when resetting the converter is required.

The generating of the plurality of control signals may include, if the converter is an apparatus requiring an input of a reset signal, generating an enable signal and a control code signal simultaneously having high values merely in a point of time when resetting the converter is required.

The checking of the type of the converter may include checking the type of the converter by receiving type ID information from the converter. The generating of the plurality of control signals may include generating the plurality of control signals by using a driver program corresponding to the type ID information.

The method may further include generating a scan image by receiving a digital signal from the converter, and storing the generated scan image.

According to another aspect of the present invention, a non-transitory computer readable recording medium including a program for executing a method of controlling a scan. The method may include checking a type of a converter configured to convert a signal scanned by an image sensor into a digital signal, generating a plurality of control signals corresponding to the checked type, and controlling the converter by using the plurality of control signals.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which:

FIG. 12 illustrates an example of a matching logic of an Analog Front End (AFE) register.

DETAILED DESCRIPTION OF THE EXEMPLARY EMBODIMENTS

Figure 1:
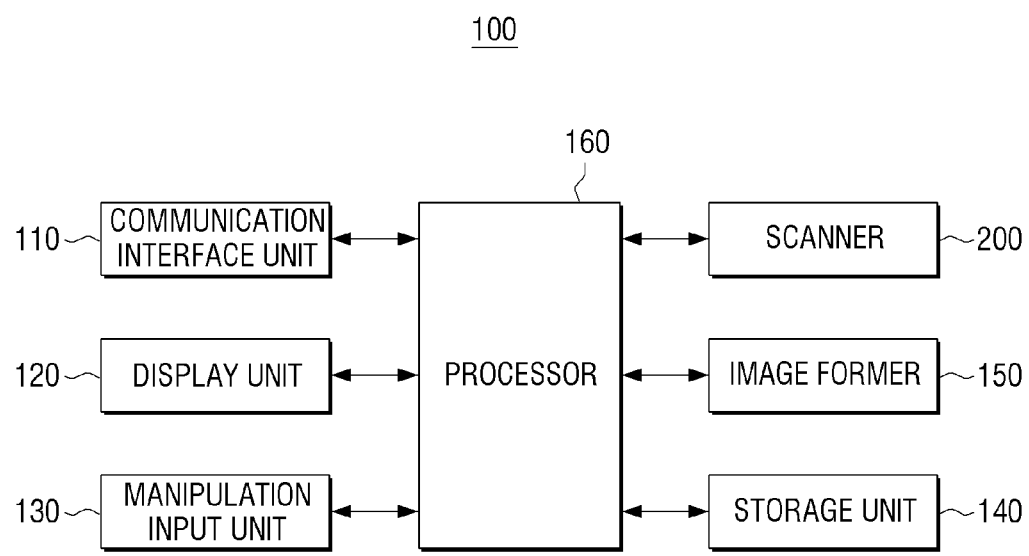
FIG. 1 is a block diagram of a configuration of an image scanning apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Hereinafter, various exemplary embodiments will be described in detail with reference to the attached drawings. Exemplary embodiments that will be described hereinafter may be modified and implemented into several different forms. In order to more clearly describe characteristics of exemplary embodiments, detailed descriptions of details that are widely known to those skilled in the art will be omitted.

When an element is "connected to" another element, this includes a "direct connection" and an "indirect connection" through another element. In addition, unless otherwise defined, when an element "includes" another element, it may mean that the element further include other elements without excluding other elements.

As used herein, an "image forming job" may refer to various types of jobs (e.g., printing, scanning, and faxing jobs) associated with an image like forming an image or generating/storing/transmitting an image file, or the like. Also, a "job" may be a meaning including all of an image forming job and a series of processes necessary for performing the image forming job.

In addition, an "image scanning apparatus" refers to an apparatus that scans an image printed on a print sheet as a digital image. Examples of the image scanning apparatus may include a scanner, a copier, a fax machine, a Multi-Function Peripheral (MFP) that complexly realizes their functions through one apparatus, and the like.

Moreover, if the image scanning apparatus has a function of printing print data on a recording sheet, the image scanning apparatus may also be referred to as an image forming apparatus. Here, the "image forming apparatus" refers to an apparatus that prints print data, which is generated from a terminal device such as a computer, on a recording sheet. Examples of the image forming apparatus may include a copier, a printer, a fax machine, a MFP that complexly realizes their functions through one apparatus, and the like.

Also, a "hard copy" may mean an operation of outputting an image to a print medium such as paper or the like, and a "soft copy" mean an operation of outputting an image to a display apparatus such as a TV, a monitor, or the like.

In addition, "contents" may refer to all kinds of data that are objects of image forming jobs such as an image, a document, a file, and the like.

"Print data" may mean data that is converted into a printable format in a printer. If the printer supports direct printing, a file may be print data.

Also, a "user" refer to a person who performs a manipulation associated with an image forming job by using an image forming apparatus or a device connected to the image forming apparatus by wireless or wire. A "manager" may refer to a person who has a right to access all functions of the image forming apparatus and a system. The "manager" and the "user" may be the same person.

FIG. 1 is a block diagram of a configuration of an image scanning apparatus 100 according to an exemplary embodiment of the present invention.

Referring to FIG. 1, the image scanning apparatus 100 includes a communication interface unit 110, a display unit 120, a manipulation input unit 130, a storage unit 140, an image former 150, a processor 160, and a scanner 200.

The communication interface unit 110 may be formed to connect the image scanning apparatus 100 to an external apparatus and may be connected to a terminal device (not shown) through a Local Area Network (LAN) and an Internet network or through a Universal Serial Bus (USB) port or a wireless port (e.g., WiFi 802.11a/b/g/n, Near Field Communication (NFC), Bluetooth, or the like).

The communication interface unit 110 may be connected to a terminal device (not shown) such as a mobile device (e.g., a smartphone, a tablet personal computer (PC), or the like), a PC, notebook PC, a Personal Digital Assistant (PDA), a digital camera, or the like and may receive a file and print data from the terminal device.

The communication interface unit 100 may transmit a scan image, which is generated from the scanner 200 or a scan image pre-stored in the storage unit 140, to the terminal device.

The communication interface unit 110 may receive new firmware for updating firmware in the image scanning apparatus 100. However, the new firmware may be received through a server or the terminal device.

The display unit 120 displays various types of information provided in the image scanning apparatus 100. In detail, the display unit 120 may display a user interface (UI) window for selecting various functions provided by the image scanning apparatus 100. The display unit 120 may be a monitor such as a Liquid Crystal Display (LCD), a Cathode Ray Tube (CRT), an Organic Light Emitting Diode (OLED), or the like or may be realized as a touch screen that may simultaneously perform functions of the manipulation input unit 130 that will be described later.

The display unit 120 may also display a control menu for performing a function of the image scanning apparatus 100.

The manipulation input unit 130 may receive a function selection and a control command of a corresponding function from a user. Here, a function may include a printing function, a copying function, a scanning function, a fax transmitting function, or the like. The manipulation input unit 130 may receive the function selection and the control command through the control menu displayed on the display unit 120. The manipulation input unit 130 may receive the control command from a mobile device or a host device through the communication interface unit 110.

The manipulation input unit 130 may be realized as a plurality of buttons, a keyboard, a mouse, or the like or may be realized as a touch screen that may simultaneously perform functions of the display unit 120 described above.

The storage unit 140 may store scan data scanned in the image scanning apparatus 100. The storage unit 140 may be realized as an internal storage medium of the image scanning apparatus 100 or an external storage medium, for example, as a removable disk including a USB memory, a storage medium connected to a host, a web server through a network, or the like.

The storage unit 140 stores the received print data. The storage unit 140 may also store the new firmware received through the communication interface unit 100.

In addition, the storage unit 140 may store driver programs according to types of AFEs. The stored driver programs may be updated as the received new firmware.

The image former 150 may print the print data. The image former 150 may form an image on a recording medium according to various types of printing methods such as an electrophotographic method, an ink-jet method, a thermal transfer method, a thermal sensitive method, and the like. For example, the image former 150 may print the image on the recording medium through a series of processes including exposing, developing, transferring, and fusing processes. A detailed structure of the image former 150 will be described later with reference to FIG. 2.

The processor 160 controls elements of the image scanning apparatus 100. In detail, the processor 160 may be realized as a Central Processing Unit (CPU), an Application Specific Integrated Circuit (ASIC), a System on Chip (SoC), or the like and senses whether a scan command is input from the user. Here, the scan command may be input through the manipulation input unit 130 of the image scanning apparatus 100 or may be input as a signal of an external apparatus through the communication interface unit 110.

If the scan command is input, the processor 160 may control the scanner 200 to perform a scan job. The processor 160 may also generate a scan image by performing image-processing with respect to a digital signal transmitted to the scanner 200. The processor 160 has been described as performing image-processing in the present exemplary embodiment. However, the scanner 200 may perform image-processing or an apparatus such as an additional Digital Signal Processor (DSP) not the scanner 200 and the processor 160 may perform image-processing.

The processor 160 may also store the generated scan image in the storage unit 140 or may control the communication interface unit 110 to transmit the generated scan image to a preset apparatus.

If a copy command is input, and thus the scan job is performed, the processor 160 may control the image former 150 to print the generated scan image.

The processor 160 checks a type of a converter (220 or an AFE) of the scanner 200 in a process of setting the image scanning apparatus 100. In detail, the processor 160 may acquire type identification (ID) information through a communication with the converter 220 and check a type of the converter by using the acquired type ID information.

Alternatively, the processor 160 may check the type of the converter 220 based on a voltage value of a port corresponding to a type ID. This example will be described later with reference to FIG. 10.

If the type of the converter 220 is checked, the processor 160 may control the converter 220 by using a driver program corresponding to the checked converter 220

In detail, the processor 160 may generate a plurality of control signals by using a driver program corresponding to the checked converter 220 among a plurality of pre-stored driver programs and provide the converter 220 with the plurality of control signals.

For example, if the checked converter 220 is an AFE not requiring a reset signal, the processor 160 may generate a plurality of control signals by using an existing method and a general method.

However, if the checked converter 220 is an AFE requiring a reset signal, the processor 160 determines whether a reset signal is required to be input into the converter 220. In detail, if the image scanning apparatus 100 is initially booted or is changed from a sleep state into a normal state, and the scan job is performed the preset number of times or more, the processor 160 may determine that the converter 220 is required to be reset.

The processor 160 may also generate the plurality of control signals so as to enable an enable signal and a clock signal to simultaneously have high values merely in a point of time when the converter 220 is required to be reset. If the enable signal and the clock signal simultaneously have the high values, the converter 220 is reset. Therefore, the processor 160 may generate the plurality of control signals so as to enable the enable signal and the clock signal not to simultaneously have the high values, so that the converter 220 is not reset in a section where the converter 220 is not required to be reset. A control cod signal may be used instead of the clock signal.

The scanner 200 scans an image or a manuscript. In detail, the scanner 200 includes a lens unit that focuses light reflected from the image or the manuscript on an internal image sensor and acquires image information of the image or the manuscript from the light focused on the internal image sensor. Detailed structure and operation of the scanner 200 will be described later with reference to FIG. 3.

As described above, the image scanning apparatus 100 according to the present exemplary embodiment may check connected AFEs, and generate and provide different driving signals according to the checked AFEs. Therefore, the image scanning apparatus 100 may use various types of AFEs. In detail, in order to separate image sensor modules, the image scanning apparatus 100 of the present invention may select and use AFEs appropriate for cost and design specifications according to manufacturers by using merely one type of main board without using different types of main boards.

An image former is included in the image scanning apparatus 100 as illustrated and described with reference to FIG. 1 but may be omitted. Also, one scanner is included as illustrated and described with reference to FIG. 1, but a plurality of scanners may be included in the image scanning apparatus 100. For example, one scanner may be included in a flatbed and the other scanner or a plurality of scanners may be included in an Automatic Document Feeder (ADF) or a Double ADF (DADF).

Figure 2:
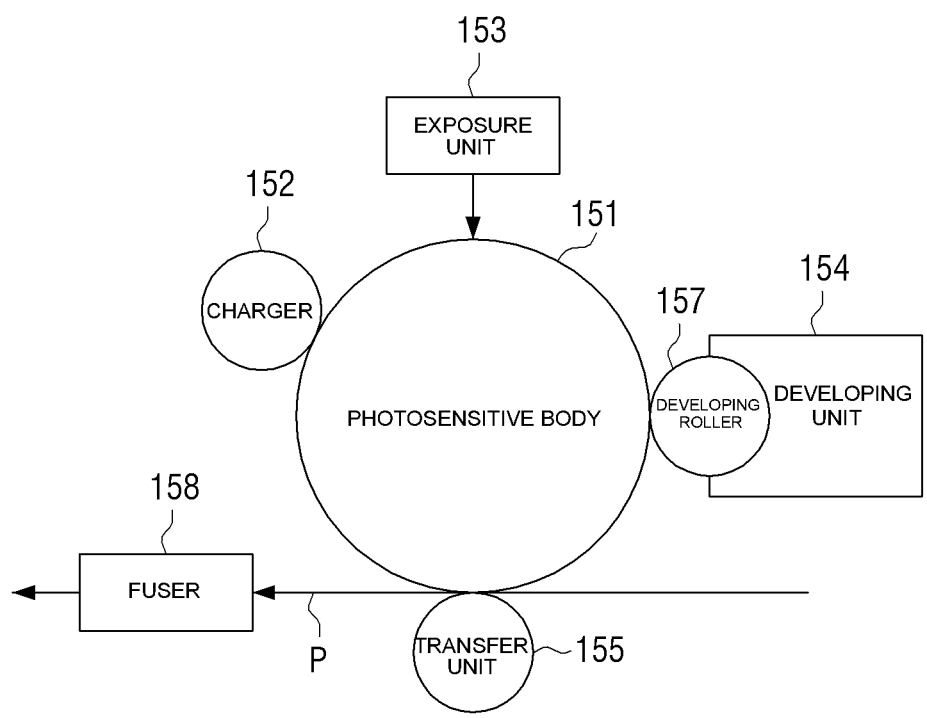
FIG. 2 illustrates a configuration of an image former of FIG. 1, according to an exemplary embodiment of the present invention.

FIG. 2 illustrates a configuration of the image former 150 of FIG. 1, according to an exemplary embodiment of the present invention.

Referring to FIG. 2, the image former 150 may include a photosensitive body 151, a charger 152, an exposure unit 153, a developing unit 154, a transfer unit 155, and a fuser 158.

The image former 150 may further include a feeding means that feeds a recoding medium P. An electrostatic latent image is formed on the photosensitive body 151. The photosensitive body 151 may be referred to as a photosensitive drum, a photosensitive belt, or the like according to a shape thereof.

The charger 152 charges a surface of the photosensitive body 151 with uniform potential. The charger 152 may be realized as a corona charger, a charger roller, a charger brush, or the like.

The exposure unit 153 forms an electrostatic latent image on the surface of the photosensitive body 151 by changing a surface potential of the photosensitive body 151 according to image information that is to be printed. For example, the exposure unit 153 may form the electrostatic latent image by irradiating modulated light onto the photosensitive body 151 according to the image information that is to be printed. The exposure unit 153 having this shape may be referred to as a photoscanner or the like, and an LED may be used as a light source.

The developing unit 154 houses a developer therein and develops the electrostatic latent image as a visible image by supplying the developer to the electrostatic latent image. The developing unit 154 may include a developing roller 157 that supplies the developer to the electrostatic latent image. For example, the developer may be supplied from the developing roller 157 to the photosensitive body 151 by a developing electric field formed between the developing roller 157 and the photosensitive body 151.

The visible image formed on the photosensitive body 151 is transferred onto the recording medium P by the transfer unit 155 or an intermediate transfer belt (not shown). For example, the transfer unit 155 may transfer the visible image onto the recording medium P by an electrostatic transfer method. The visible image may stick onto the recording medium P by an electrostatic attraction.

The fuser 158 fuses the visible image on the recording medium P by applying heat and/or pressure to the visible image sticking on the recording medium P. A print job is completed by a series of processes described above.

The above-described developer is used whenever an image forming job is performed and thus is exhausted if being used for a preset time or more. In this case, a unit (e.g., the developing unit 154 described above) storing the developer may be newly replaced. As described above, parts or components that may be replaced in a process of using the image scanning apparatus 100 are referred to as consumable units or replaceable units. Also, a memory (or a Customer Replaceable Unit Monitoring (CRUM) chip) may be attached to such a consumable unit in order to appropriately manage the corresponding consumable unit.

Figure 3:
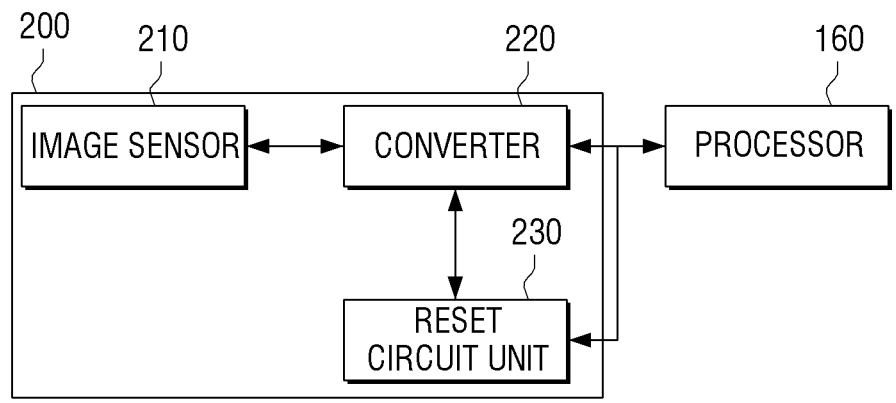
FIG. 3 is a block diagram of a configuration of a scanner of FIG. 1, according to an exemplary embodiment of the present invention.

FIG. 3 is a block diagram of a configuration of the scanner 200 of FIG. 1, according to an exemplary embodiment of the present invention. In detail, the scanner 200 according to the present exemplary embodiment uses an AFE requiring a reset signal.

Referring to FIG. 3, the scanner 200 includes an image sensor 210, the converter 220, and a reset circuit unit 230.

The image sensor 210 (or an image sensor circuit) scans image information of a manuscript from light reflected from the manuscript. Here, the image sensor 210 may be realized as a Complementary Metal Oxide Semiconductor (CMOS) image sensor (CIS).

The converter 220 (or a conversion circuit or an AFE) converts a signal scanned by the image sensor 210 into a digital signal. In detail, a CIS outputs a scanned signal as an analog signal. Therefore, the converter 220 may convert the signal scanned by the CIS into a digital signal and transmit the converted digital signal to the processor 160.

The converter 220 may also receive a plurality of control signals from the processor 160 and control the above-described conversion operation and an operation of the image sensor 210 according to the received control signals.

In addition, the converter 220 receives a reset signal from the reset circuit unit 230 that will be described later and, if a reset signal having a low value is input, performs a reset operation.

The reset circuit unit 230 generates a reset signal by using a plurality of control signals and provides the converter 220 with the generated reset signal. In detail, the reset circuit unit 230 may be constituted as a NAND logic circuit. The NAND logic circuit is a logic element that receives two signals, outputs a low value (e.g. 0) merely when both of the two signals have high values (e.g. 1), and outputs a high value in other input states.

Therefore, if an enable signal and a clock signal are input into an input terminal of the NAND logic element, the reset circuit unit 230 outputs a low value merely when both of the enable signal and the clock signal simultaneously have high values. In the present exemplary embodiment, since the converter 220 is reset merely if a reset signal having a low value is input, the NAND logic element is used. However, if the converter 220 is reset in response to a reset signal having a high value, a different logic element from the NAND logic element may be used.

The converter 220 may also include a resistor-capacitor (RC) filter in order to reinforce a noise characteristic of a reset signal output from the NAND logic element. Here, the RC filter may be disposed between an output terminal of the NAND logic element and a reset terminal of the converter 220. Also, a resistor constituting the RC filter may have a value between 10 ohms and 33 ohms, and a capacitor constituting the RC filter may have a value between 10 pF and 100 pF. Ranges of these values are merely an exemplary embodiment and thus may be changed according to application environments.

As described above, although the scanner 200 according to the present exemplary embodiment does not additionally receive a reset signal from the processor 160, the scanner 200 may generate and use a reset signal through transmitted another control signal. Therefore, even if the scanner 200 according to the present exemplary embodiment uses an AFE requiring a reset signal, an interface type of a main board is not required to be changed.

The scanner 200 has been described as merely including the image sensor 210, the converter 220, and the reset circuit unit 230 with reference to FIG. 3. However, besides the above-described elements, other elements may be added.

The converter 220 and the processor 160 have been described as being directly connected to each other in the present exemplary embodiment but may be connected to each other through a terminal, a cable, or the like.

The processor 160 and the converter 220 of FIG. 1 have been described as performing communications with each other. However, besides the processor 160 of FIG. 1, an additional DSP, CPU, or SoC used for merely a scanner may be disposed between the converter 220 and the processor 160 so as to control the converter 220.

The reset circuit unit 230 has been described as an element separating from the converter 220 in the present exemplary embodiment. However, the reset circuit unit 230 and the converter 220 may be realized as one element.

Figure 4:
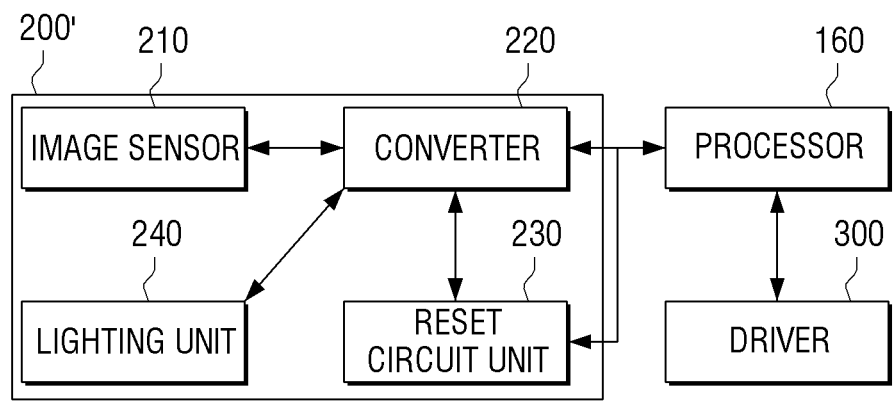
FIG. 4 is a block diagram of the scanner of FIG. 1, according to another exemplary embodiment of the present invention.

FIG. 4 is a block diagram of a configuration of a scanner 200' of FIG. 1, according to another exemplary embodiment of the present invention. In detail, the scanner 200' according to the present exemplary embodiment uses an AFE requiring a reset signal.

Referring to FIG. 4, the scanner 200' includes an image sensor 210, a converter 220, a reset circuit unit 230, and a lighting unit 240. Also, the processor 160 is connected to the converter 220 and a driver 300.

The image sensor 210 and the reset circuit unit 230 perform the same functions as the image sensor 210 and the reset circuit unit 230 of FIG. 3, and thus their repeated descriptions are omitted.

The converter 220 (or a conversion circuit or an AFE) converts a signal scanned by the image sensor 210 into a digital signal.

The converter 220 also receives a plurality of control signals from the processor 160 and controls the above-described conversion operation and an operation of the image sensor 210 according to the received control signals.

In addition, the converter 220 receives a reset signal from the reset circuit unit 230 that will be described later and, if a reset signal having a low value is input, performs a reset operation.

The converter 220 also controls the lighting unit 240. In detail, the converter 220 may provide the lighting unit 240 with a control signal for controlling an amount of light irradiated from the lighting unit 240.

The lighting unit 240 irradiates light onto a manuscript. In detail, the lighting unit 240 may irradiate a preset amount of light according to an operating pulse provided from the converter 220. Here, the lighting unit 240 may irradiate a required amount of light onto the manuscript by performing on and/or off operations according to a Pulse Width Modulation (PWM) method. The lighting unit 240 may be realized as a light source as an LED, an Active Matrix OLED (AMOLED), or the like. An exemplary embodiment using an LED as a light source has been described in the present exemplary embodiment, but a Cold Cathode Fluorescent Lamp (CCFL) may be used as a light source.

The driver 300 enables the manuscript to pass above the image sensor 210. In detail, if a scan command is input, the driver 300 may enable the manuscript to pass above the image sensor 210 by moving the manuscript or moving the scanner 200' under control of the processor 160.

The processor 160 controls operations of the scanner 200' and the driver 300. In detail, if the scan command is input, the processor 160 may control the driver 300 to position the manuscript above the image sensor 210 and, if the manuscript is positioned above the image sensor 210, may control the image sensor 210 and the lighting unit 240 through the converter 220 so as to perform a scan operation.

The driver 300 has been described as being disposed outside the scanner 200' as illustrated and shown in FIG. 4 but may be disposed inside the scanner 200' and operate under control of the converter 220.

Figure 5:
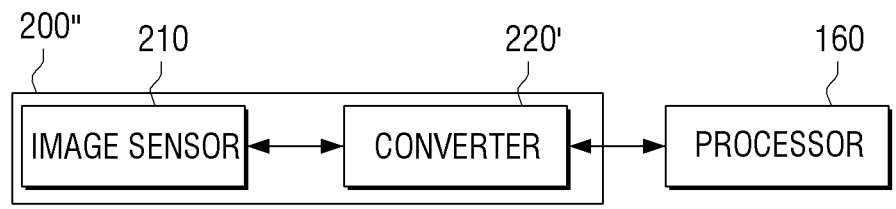
FIG. 5 is a block diagram of the scanner of FIG. 1, according to another exemplary embodiment of the present invention.

FIG. 5 is a block diagram of a configuration of a scanner 200" of FIG. 1, according to another exemplary embodiment of the present invention. In detail, the scanner 200" according to the present exemplary embodiment is an exemplary embodiment using an AFE not requiring a reset signal.

Referring to FIG. 5, the scanner 200" includes an image sensor 210 and a converter 220'.

The image sensor 210 performs the same function as the image sensor 210 of FIG. 3, and thus a repeated description thereof is omitted.

The converter 220' (or a conversion circuit or an AFE) converts a signal scanned by the image sensor 210 into a digital signal.

The converter 220' also receives a plurality of control signals from the processor 160 and controls an operation of the image sensor 210 according to the received control signals.

In addition, the converter 220' performs a reset operation in terms of software. In detail, the converter 220' does not include an additional terminal for receiving a reset signal and performs the reset operation in terms of software according to a control signal transmitted from the processor 160.

The converter 220' may be a SoC into which the converter 220 and the reset circuit unit 230 of FIG. 3 are integrated.

The scanner 200" according to the present exemplary embodiment may operate by using an interface of the exemplary embodiment of FIG. 3 or 4 as it is.

The scanner 200" has been described as including merely an image sensor and a converter as illustrated and shown in FIG. 5 but may further include elements such as a lighting unit, a driver, and the like as shown in FIG. 4.

Figure 6:
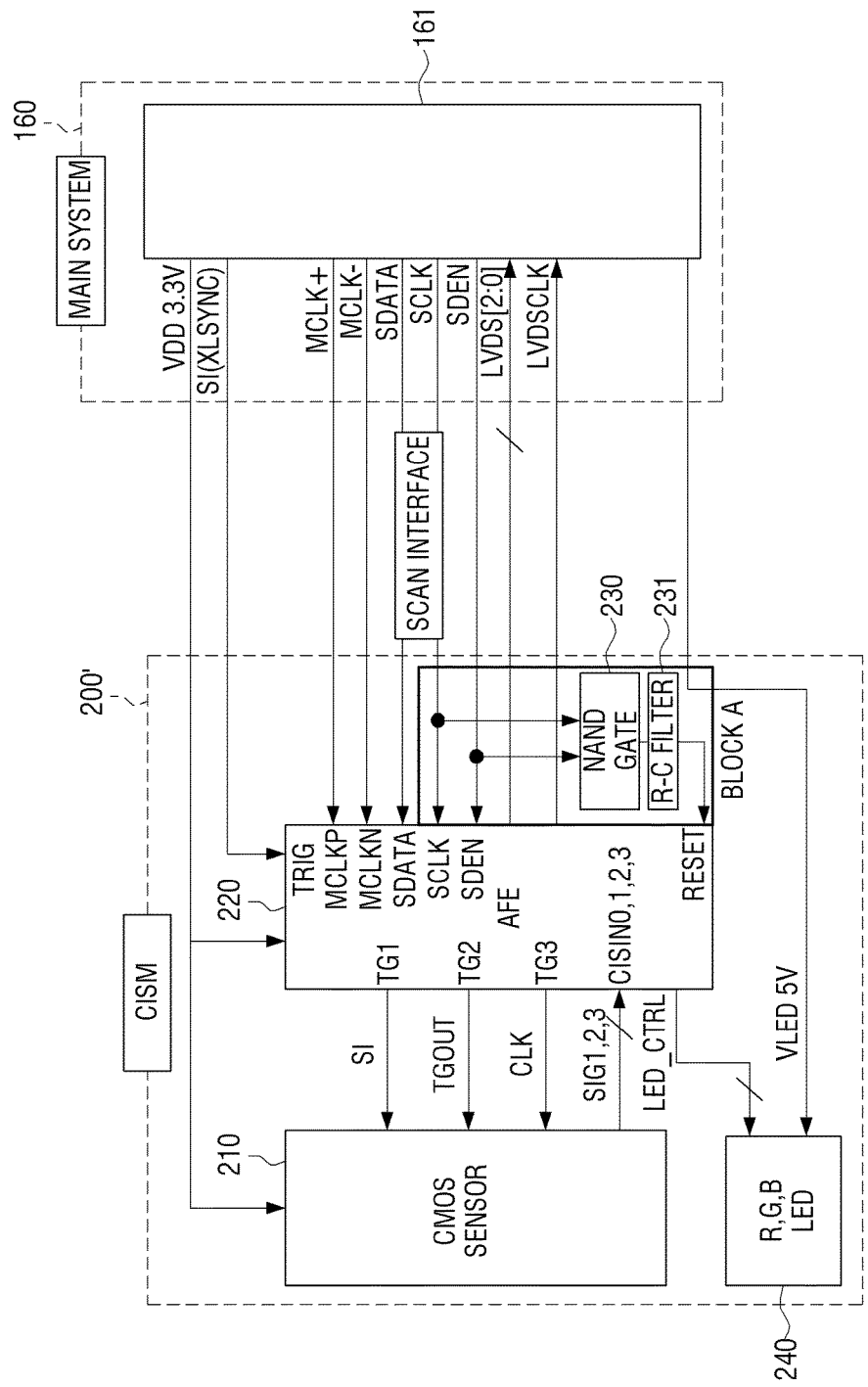
FIG. 6 illustrates a circuit configuration of the scanner of FIG. 4.

FIG. 6 illustrates a circuit configuration of the scanner 200' according to the exemplary embodiment of FIG. 4.

Referring to FIG. 6, the scanner 200" includes the image sensor 210, the converter 220, the reset circuit unit 230, and the lighting unit 240.

The image sensor 210 (or an image sensor circuit) is realized as a CIS. The CIS scans image information of a manuscript from light reflected from the manuscript.

The converter 220 operates as an AFE to control the image sensor 210 and the lighting unit 240 and convert an analog video signal reflected from and penetrating the manuscript into a digital data signal.

In order to perform this role, the converter 220 communicates with the processor 160 through a Serial Input/Output (I/O) Interface (SIO) and receives a plurality of control signals through the processor 160. Here, the plurality of control signals may include MCLK+, MCLK−, SDATA, SCLK, and SDEN. Also, the SIO may further include LVDS [2:0] and LVDSCLK that transmit the above-mentioned control signals and digital data to the processor 160 and may transmit power (3.3 V or 5 V) necessary for an operation of the scanner 200'.

The processor 160 may perform a reading or writing operation with reference to a register of the converter 220 through the SIO and control the image sensor 210 according to an operation condition and a state of a system.

The converter 220 of FIG. 6 is an AFE requiring a reset signal, but the SIO of FIG. 6 does not transmit a reset signal. However, in the present exemplary invention, the scanner 200' generates and uses a reset signal through a clock signal SCLK and an enable signal SDEN of the SIO.

For this, the scanner 200' includes a reset circuit unit. The reset circuit unit may include an NAND logic element and an RC filter.

The NAND logic element receives a clock signal and an enable signal and outputs an NAND logic result of the clock signal and the enable signal to an RC filter 231.

The RC filter 231 reduces noise from an output signal of the NAND logic element and then provides a reset terminal of the converter 220 with the output signal of the NAND logic element from which the noise is reduced. In detail, an image scanning apparatus including a CIS may have immunity such as Electro Static Discharge (ESD) so as not to affect qualities of a scan and a copy even though external noise comes into the image scanning apparatus.

An RC filter is added to an output terminal of the NAND logic element as a job for reducing ESD noise and EFT noise. Here, The R may have a value between 10 ohm and 33 ohm, and the C may have a value between 10 pF and 100 pF.

In general, in a scanner according to the exemplary embodiment as shown in FIG. 3, i.e., a CIS requiring a reset signal, a pull-up resistor exists on an external main board, and a decap is assembled in an internal port of an AFE.

In this point, signals of an SIO as described above may be connected to an input pin of an AFE and simultaneously connected to an input node of an NAND logic element, and an original function of reading or writing of a register of the AFE may be maintained by connecting an output of the NAND logic element to a reset signal of the AFE. Also, a malfunction caused by noise may be interrupted by connecting an RC filter to the output node of the NAND logic element in order to control resetting of the AFE regardless of ESD and FET noises.

Figure 7:
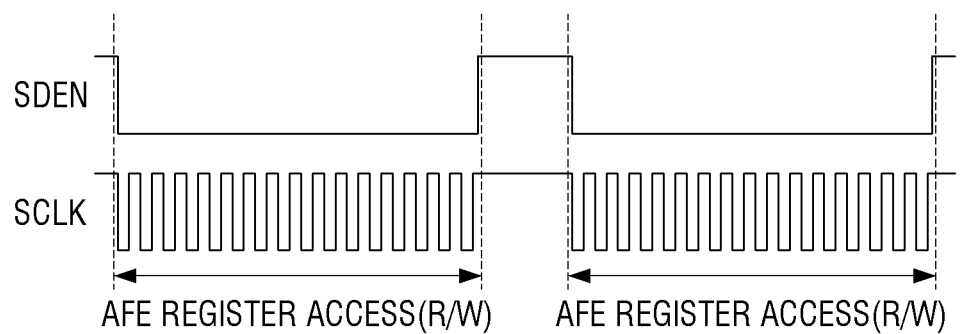
FIG. 7 is a waveform diagram illustrating forms of a first signal and a second signal of FIG. 6.

FIG. 7 is a waveform diagram illustrating forms of a first signal and a second signal of FIG. 6. In detail, FIG. 7 illustrates an operation relation between a clock signal SCLK and an enable signal SDEN.

The enable signal SDEN is a signal indicating a section where reading and/or writing are possible with respect to an AFE register, and a clock signal SCLK is a signal indicating reading and/or writing timings in the above-described section.

Referring to FIG. 7, merely when the enable signal SDEN has a low value, an access (or writing) to the AFE register is possible. If the enable signal SDEN has a high value, the access to the AFE register is impossible.

In the present exemplary embodiment, in consideration of this point, a clock signal is controlled to be generated merely when a register is accessed and maintain a low value in a section where the register is not accessed.

Also, the clock signal is toggled to a high value in a system state requiring an AFE resetting operation (e.g., when a system is powered on or woken up) so as to enable an NAND logic element to output a low value in order to reset the AFE.

This operation will be described in detail with reference to FIG. 8.

Figure 8:
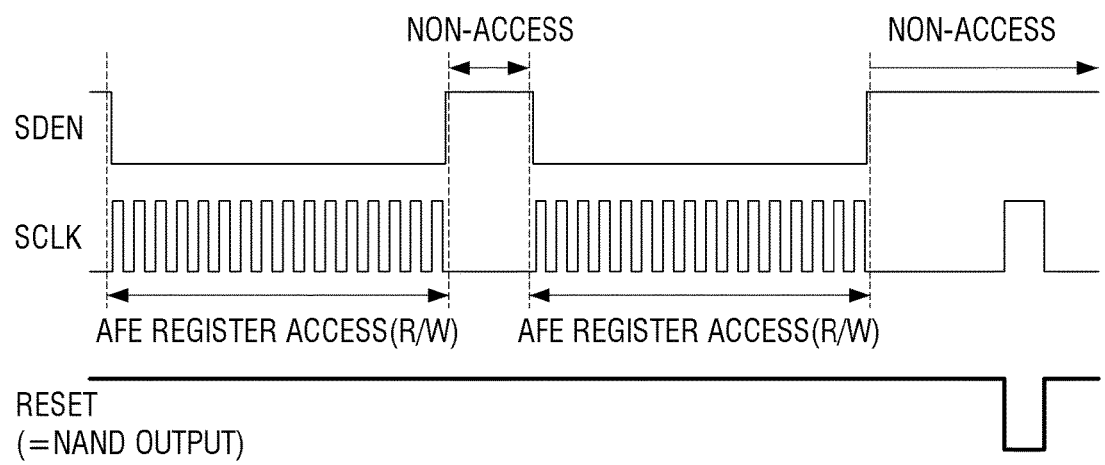
FIG. 8 is a waveform diagram for describing an operation of an NAND logic element of FIG. 6.

FIG. 8 is a waveform diagram illustrating an operation of the NAND logic element of FIG. 6.

Referring to FIG. 8, a clock signal SCLK may have a clock form merely when a register is accessed and maintain a low value in a section where the register is not accessed.

Also, the clock signal SCLK is toggled to a high value in a system state requiring an AFE resetting operation.

If input values are all high values, the NAND logic element outputs a low value, and thus an AFE may be reset by outputting a low value in response to togging of the high value of the clock signal SCLK.

As described above, in the present exemplary embodiment, original functions of reading and/or writing of an AFE register may be maintained, and resetting of an AFE may be additionally controlled by adding an NAND logic element and controlling several signals output from a processor.

A reset signal has been described as being generated by using merely an enable signal and a clock signal as described with reference to FIGS. 7 and 8 but may be generated through other signals besides the above-described signals. This example will be described later with reference to FIG. 9.

Figure 9:
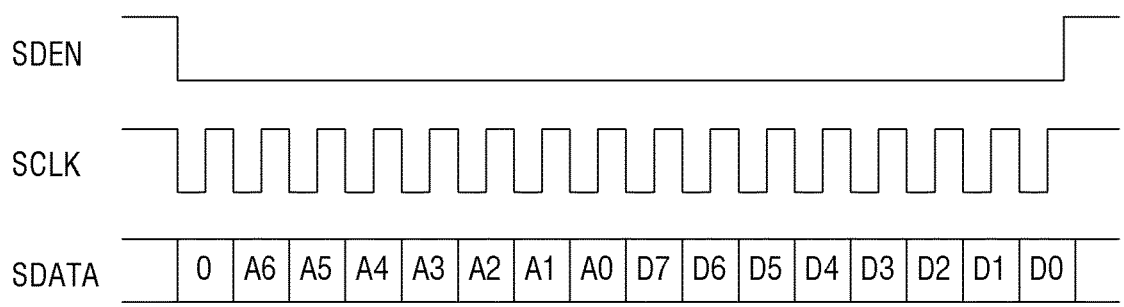
FIG. 9 is a waveform diagram for describing a relation between a clock signal and a data signal.

FIG. 9 is a waveform diagram illustrating a relation between a clock signal SDEN and a data signal SDATA.

Referring to FIG. 9, merely when the enable signal SDEN has a low value, an access (or writing) to an AFE register is possible. Also, a value of a control code signal SDATA changes in this section where the access to the AFE register is possible, and when the enable signal SDEN has a high value, the access to the AFE register is impossible.

Therefore, in consideration of this point, the control code signal SDATA is controlled to have a particular value merely when the AFE register is accessed and maintain a low value in a section where the AFE register is not accessed.

Also, an AFE may be reset so as to enable the NAND logic element to output a low value by toggling the control code signal SDAT to a high value in a system state requiring an AFE resetting operation.

Figure 10A:
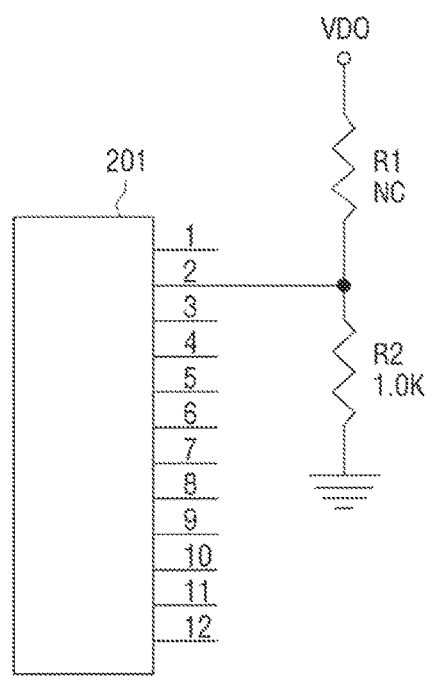
FIGS. 10A and 10B illustrate a method of generating type information.
Figure 10B:
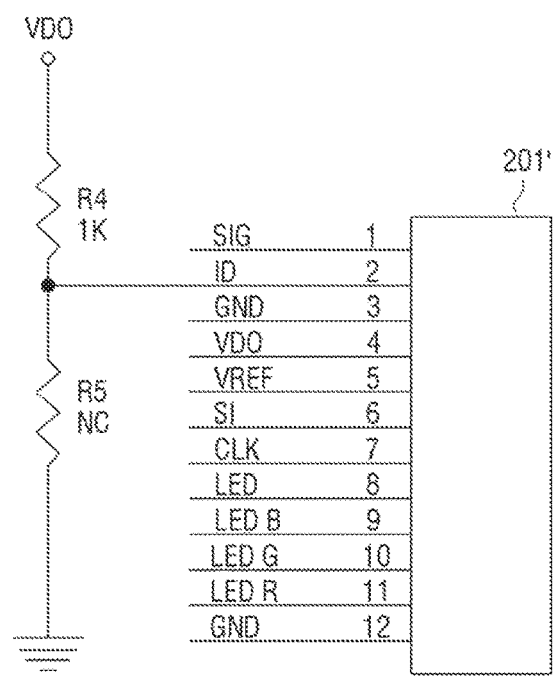

FIGS. 10A and 10B illustrate a method of generating type information.

FIG. 10A illustrates a resistor disposed in a scanner 200 including a converter requiring a reset signal. FIG. 10B illustrates a resistor disposed in the scanner 200 including a converter not requiring a reset signal.

Referring to FIGS. 10A and 10B, both of the two resistors are connected to a particular pin of an interface terminal 201. However, one of the two resistors is constituted as a pull-up resistor, and the other one is constituted as a pull-down resistor.

Therefore, an intermediate node of the resistor of FIG. 10A and an intermediate node of the resistor of FIG. 10B have different voltage values. As a result, the processor 160 may scan a voltage value of the interface terminal 201 and may check whether a converter requiring a reset signal or a converter not requiring a reset signal is installed in connected scanner, based on the voltage value.

Figure 11:
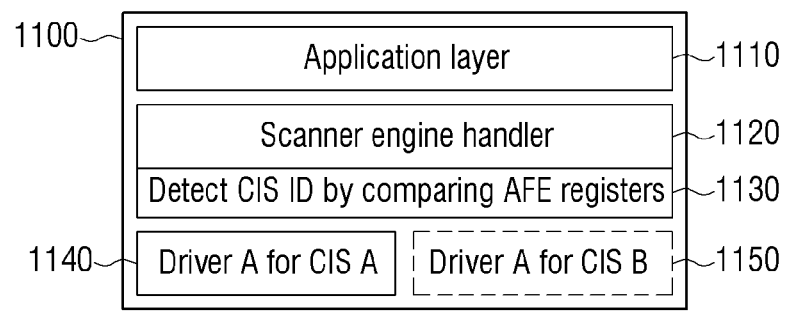
FIG. 11 illustrates a structure of firmware according to an exemplary embodiment of the present invention.

FIG. 11 illustrates a structure of firmware 1100 according to an exemplary embodiment of the present invention. FIG. 12 illustrates an example of a matching logic of an AFE register.

Referring to FIG. 11, the firmware 1100 includes an application layer 1110, a scanner engine handler 1120, a detector layer 1130, and a plurality of driver programs 1140 and 1150.

The application layer 1110 and the scanner engine handler 1120 perform the same functions as an existing application layer and an existing scanner engine handler, and thus their repeated descriptions are omitted.

The detector layer 1130 is a structure used to identify a type of a converter included in a scanner.

The driver program 1140 is a driver program required to control a converter requiring a reset signal.

The driver program 1150 is a driver program required to control a converter not requiring a reset signal.

As described above, if driver programs for controlling a converter are structuralized to be constituted as module units (e.g., sub-firmware), a whole part of firmware may be replaced or merely a part of a particular driver program may be updated.

For example, if a driver of a dual CIS (of manufacturer B) is not included in main firmware of a user, and a dual CIS (of manufacturer A) is installed when CIS exchange A/S occurs, the installed CIS may be identified by the detector layer 1130. As a result, a dual CIS (or AFE) driver may be automatically downloaded and normally operate through a connection to the Internet or a USB by matching logics (a sum after increasing counts when AFE default registers values match each other) of respective CIS (AFE) manufacturers as shown in FIG. 11.

Also, the downloading of the dual CIS may be notified to a user, and a matching logic may be inspected after downloading a driver, if matching results do not correspond to each other, a failure of a connection of a CIS may be notified.

Figure 13:
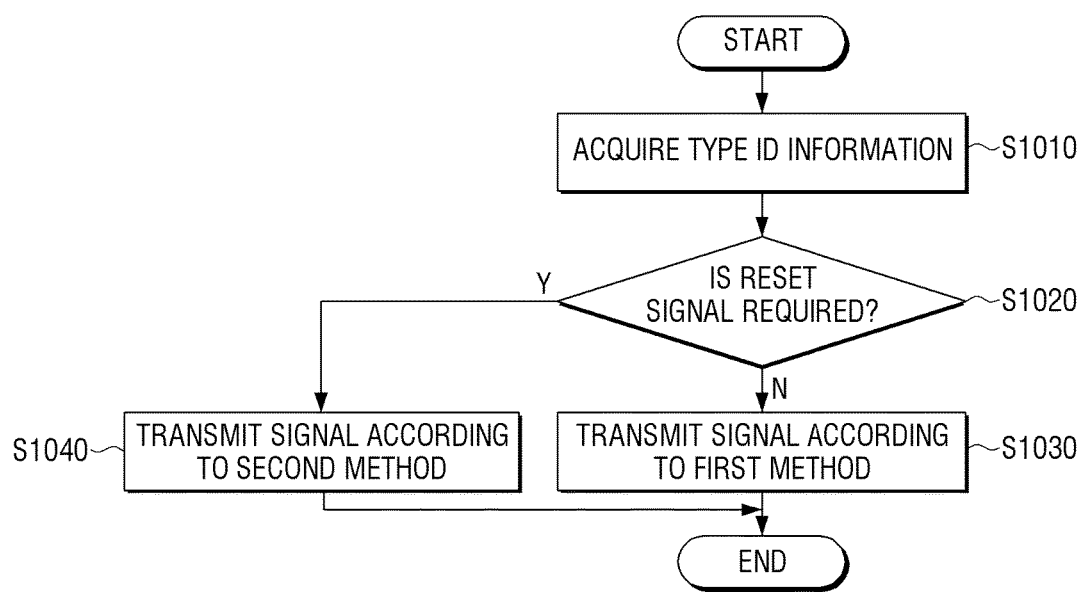
FIG. 13 is a flowchart illustrating an interface type according to an exemplary embodiment of the present invention.

FIG. 13 is a flowchart illustrating an interface type according to an exemplary embodiment of the present invention.

Referring to FIG. 13, in operation S1010, a type of a converter that converts a signal scanned by an image sensor into a digital signal is checked. In detail, the type of the converter may be checked by receiving type ID information from the converter, and a driver program corresponding to the type ID information may be loaded. The type of the converter may be checked by reading a value of a resistor connected to a particular pin without directly receiving the type ID information from the converter.

Also, a plurality of control signals are generated according to a method corresponding to the checked type. In detail, if the checked type of the converter does not require a reset signal in operation S1020, the converter may be controlled by generating a control signal according to a general method in operation S1030.

If the checked type of the converter requires a reset signal in operation S1020, the converter may be controlled by generating a control signal into which a state of a part of the control signal of the general method is converted, in operation S1040. In detail, if the converter is an apparatus requiring an input of a reset signal, an enable signal and a clock signal simultaneously having high values may be generated merely in a point of time when resetting of the converter is required. Alternatively, an enable signal and a control code signal simultaneously have high values may be generated merely in a point of time when resetting of the converter is required.

Also, the converter is controlled by using the plurality of control signals that are generated, and thus a digital signal is received from the converter. In addition, a scan image may be generated through the received digital signal, stored in a storage unit in response to a scan command of the user or transmitted to or printed in another apparatus.

Therefore, a scan control method according to the present exemplary embodiment may check connected AFEs, and may generate and provide different driving signals according to the checked AFEs, thereby using various types of AFEs. In detail, the scan control method of the present exemplary embodiment may select and use AFEs appropriate for cost and design specifications according to respective manufacturers with merely one type of main board without using different types of main boards in order to dualize image sensor modules. The scan control method as shown in FIG. 13 may be executed on an image scanning apparatus having the structure of FIG. 1 or on other image scanning apparatuses having other types of structures.

Also, the scan control method as described above may be embodied as at least one execution program for executing the scan control method as described above, and the execution program may be stored on a non-transitory computer readable recording medium.

Therefore, blocks of the present invention may be implemented as computer recordable codes on the non-transitory computer readable recording medium. The non-transitory computer readable recording medium may be a device that may store data that may be read by a computer system.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:
1. An image scanning apparatus comprising:
an image sensor to scan an image to produce an analog signal;

a converter to convert the analog signal into a digital signal;
at least one processor to:
control the converter to convert the analog signal into the digital signal using a plurality of control signals communicable between the converter and the at least one processor, and
perform image-processing of the digital signal; and
a reset circuit to:
generate a reset signal to reset the converter based on at least one control signal of the plurality of control signals being communicated between the converter and the at least one processor, and
provide the reset signal to the converter, to reset the converter.

2. The image scanning apparatus of claim 1, wherein:
the at least one control signal of the plurality of control signals includes an enable signal and a clock signal, and
the reset circuit includes a NAND logic circuit to perform NAND logic based on the enable signal and the clock signal.

3. The image scanning apparatus of claim 2, wherein the reset circuit includes a resistor-capacitor (RC) filter to reduce output noise of the NAND logic circuit.

4. The image scanning apparatus of claim 2, wherein, to reset the converter, the at least one processor is to enable the enable signal and the clock signal to simultaneously have high values, such that the reset circuit generates the reset signal based on the enable signal and the clock signal simultaneously having high values.

5. The image scanning apparatus of claim 1, wherein:
the at least one control signal of the plurality of control signals includes an enable signal and a control code signal,
the reset circuit includes a NAND logic circuit to perform NAND logic based on the enable signal and the control code signal.

6. The image scanning apparatus of claim 5, wherein, to reset the converter, the at least one processor is to enable the enable signal and the control code signal to simultaneously have high values, such that the reset circuit generates the reset signal based on the enable signal and the control code signal simultaneously having the high values.

7. The image scanning apparatus of claim 1, wherein the at least one processor is to:
check a type of the converter,
generate control signals among the plurality of control signals corresponding to the checked type of the converter, and
provide the generated control signals to the converter.

8. The image scanning apparatus of claim 7, wherein the at least one processor is to check the type of the converter by receiving type identification (ID) information from the converter.

9. The image scanning apparatus of claim 8, wherein the at least one processor is to generate the plurality of control signals using a driver program corresponding to the received type ID information among a plurality of driver programs that are pre-stored.

10. The image scanning apparatus of claim 1, further comprising:
a pull-up resistor or a pull-down resistor, which corresponds to a type of the converter,
wherein the at least one processor is to check the type of the converter according to a voltage value of the pull-up resistor or the pull-down resistor.

11. The image scanning apparatus of claim 1, wherein the image sensor is a Complementary Metal Oxide Semiconductor (CMOS) image sensor (CIS).

12. The image scanning apparatus of claim 1, further comprising:
a lighting unit to project light on the image,
wherein the converter controls the lighting unit.

13. The image scanning apparatus of claim 1, further comprising:
a storage to store the image-processed digital signal as image data.

14. The image scanning apparatus of claim 1, further comprising:
an image former to print the scanned image based on the image-processed digital signal.

15. A method by a controller of an image scanning apparatus, the method comprising:
checking a type of a converter, the converter to convert an analog signal based on an image scanned by an image sensor into a digital signal;
generating a plurality of control signals to control the converter to convert the analog signal into the digital signal, according to, among a plurality of stored control methods, a control method corresponding to the checked type of the converter, the plurality of control signals communicable between the converter and the controller; and
controlling the converter using the generated plurality of control signals to convert the analog signal into the digital signal, according to the control method corresponding to the checked type.

16. The method of claim 15, wherein:
the generating of the plurality of control signals includes, when the type of the converter is a converter type requiring an input of a reset signal,
to provide the required input of the reset signal to the converter, generating an enable signal and a clock signal simultaneously having high values.

17. The method of claim 15, wherein:
the generating of the plurality of control signals includes, when the type of the converter is a converter type requiring an input of a reset signal,
to provide the required input of the reset signal to the converter, generating an enable signal and a control code signal simultaneously having high values.

18. The method of claim 15, wherein:
the checking the type of the converter includes checking the type of the converter by receiving type identity (ID) information from the converter, and
the generating the plurality of control signals includes generating the plurality of control signals using a driver program corresponding to the type ID information.

19. The method of claim 15, further comprising:
generating image data for the scanned image based on the digital signal; and
storing the generated image data.

20. A non-transitory computer readable recording medium comprising a program that, when executed by at least one processor, causes the following to be performed by a controller of an image scanning apparatus:
checking a type of a converter to convert an analog signal based on an image scanned by an image sensor into a digital signal;
generating a plurality of control signals corresponding to the checked type of the converter, the plurality of control signals communicable between the converter and the controller, to control the converter to convert the analog signal into the digital signal; and controlling the converter to convert the analog signal into the digital signal using the plurality of control signals corresponding to the checked type of the converter.

* * * * *

UNITED STATES PATENT AND TRADEMARK OFFICE
CERTIFICATE OF CORRECTION

PATENT NO. : 10,225,437 B2  
APPLICATION NO. : 15/668145  
DATED : March 5, 2019  
INVENTOR(S) : Jung-han Kim et al.

Page 1 of 1

It is certified that error appears in the above-identified patent and that said Letters Patent is hereby corrected as shown below:

In the Specification

Column 6, Lines 57-59, delete "If the type of the converter 220 is checked, the processor 160 may control the converter 220 by using a driver program corresponding to the checked converter 220" and insert -- If the type of the converter 220 is checked, the processor 160 may control the converter 220 by using a driver program corresponding to the checked converter 220. --, therefor.

Signed and Sealed this  
Twenty-second Day of December, 2020

Andrei Iancu  
*Director of the United States Patent and Trademark Office*